(12) United States Patent
Kadel et al.

(10) Patent No.: US 10,873,531 B2
(45) Date of Patent: *Dec. 22, 2020

(54) DATA FLOW MANAGER FOR DISTRIBUTING DATA FOR A DATA STREAM OF A USER EQUIPMENT, COMMUNICATION SYSTEM AND METHOD

(71) Applicant: Deutsche Telekom AG, Bonn (DE)

(72) Inventors: Gerhard Kadel, Darmstadt (DE); Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 56 days.

This patent is subject to a terminal disclaimer.

(21) Appl. No.: 16/255,854

(22) Filed: Jan. 24, 2019

(65) Prior Publication Data

US 2019/0238468 A1 Aug. 1, 2019

(30) Foreign Application Priority Data

Jan. 26, 2018 (EP) .................................... 18153730

(51) Int. Cl.
*H04L 12/851* (2013.01)
*H04W 28/08* (2009.01)
(Continued)

(52) U.S. Cl.
CPC ............ *H04L 47/24* (2013.01); *H04B 17/336* (2015.01); *H04L 43/0823* (2013.01);
(Continued)

(58) Field of Classification Search
None
See application file for complete search history.

(56) References Cited

U.S. PATENT DOCUMENTS 7,159,235 B2 * 1/2007 Son ..................... H04L 12/2801
725/91
7,583,677 B1 * 9/2009 Ma ......................... H04L 45/00
370/235
(Continued)

FOREIGN PATENT DOCUMENTS

WO WO 2016195546 A1 12/2016

OTHER PUBLICATIONS

BT PLC: "Multi-access converged NG Core architecture"; S2-163455, 3$^{rd}$ Generation Partnership Project (3GPP), vol. SA WG2, Jul. 11, 2016-Jul. 15, 2016, Jul. 10, 2016 (Jul. 10, 2016), XP051118053.

*Primary Examiner* — Jamaal Henson
(74) *Attorney, Agent, or Firm* — Leydig, Voit & Mayer, Ltd.

(57) ABSTRACT

A data flow manager for distributing data of a data stream of a user equipment via a first communication link and via a second communication link includes: a network interface configured to receive a first status signal indicating a link quality of the first communication link, a second status signal indicating a link quality of the second communication link and a third status signal indicating a link quality of a composite communication link; and a processor configured to, if at least one of the first status signal or the second status signal indicates a higher link quality than a link quality that is indicated by the third status signal, determine a reduction of an amount of data of the data stream communicated over the first communication link and an increase of an amount of data of the data stream communicated over the second communication link.

15 Claims, 4 Drawing Sheets

(51) Int. Cl.
  *H04B 17/336* (2015.01)
  *H04L 12/26* (2006.01)
  *H04W 88/06* (2009.01)

(52) U.S. Cl.
  CPC ...... *H04L 43/0852* (2013.01); *H04L 43/0882* (2013.01); *H04L 43/0888* (2013.01); *H04W 28/085* (2013.01); *H04W 88/06* (2013.01)

(56) References Cited

U.S. PATENT DOCUMENTS

| | | | | |
|---|---|---|---|---|
| 10,581,750 B2* | 3/2020 | Kadel | ................... | H04L 47/125 |
| 2002/0136170 A1* | 9/2002 | Struhsaker | ............ | H04L 1/0005 |
| | | | | 370/280 |
| 2007/0116012 A1* | 5/2007 | Chang | ................... | H04W 48/18 |
| | | | | 370/395.52 |
| 2008/0137630 A1* | 6/2008 | Park | ...................... | H04W 28/06 |
| | | | | 370/338 |
| 2010/0097931 A1* | 4/2010 | Mustafa | ................ | H04L 43/087 |
| | | | | 370/235 |
| 2011/0069713 A1* | 3/2011 | Mariblanca Nieves | ..................... | |
| | | | | H04L 45/123 |
| | | | | 370/400 |
| 2012/0244800 A1* | 9/2012 | Yen | ....................... | H04W 28/08 |
| | | | | 455/39 |
| 2013/0028247 A1* | 1/2013 | Li | ......................... | H04W 76/16 |
| | | | | 370/338 |
| 2014/0328423 A1* | 11/2014 | Agee | .................... | H04W 52/241 |
| | | | | 375/267 |
| 2014/0376657 A1* | 12/2014 | Agee | ................... | H04W 52/265 |
| | | | | 375/267 |
| 2015/0127708 A1* | 5/2015 | Quinlan | ................. | H04W 4/50 |
| | | | | 709/201 |
| 2016/0174107 A1 | 6/2016 | Kanugovi et al. | | |
| 2016/0218947 A1* | 7/2016 | Hughes | ............... | H04L 12/2854 |

* cited by examiner

DATA FLOW MANAGER FOR DISTRIBUTING DATA FOR A DATA STREAM OF A USER EQUIPMENT, COMMUNICATION SYSTEM AND METHOD

CROSS-REFERENCE TO RELATED APPLICATIONS

Priority is claimed to European Patent Application No. EP 18153730.9, filed on Jan. 26, 2018, the entire disclosure of which is hereby incorporated by reference herein.

FIELD

The invention relates to a data flow manager for distributing data of a data stream of a user equipment via a first communication link and via a second communication link. The invention further relates to a communication system and a method.

BACKGROUND

Figure 1:
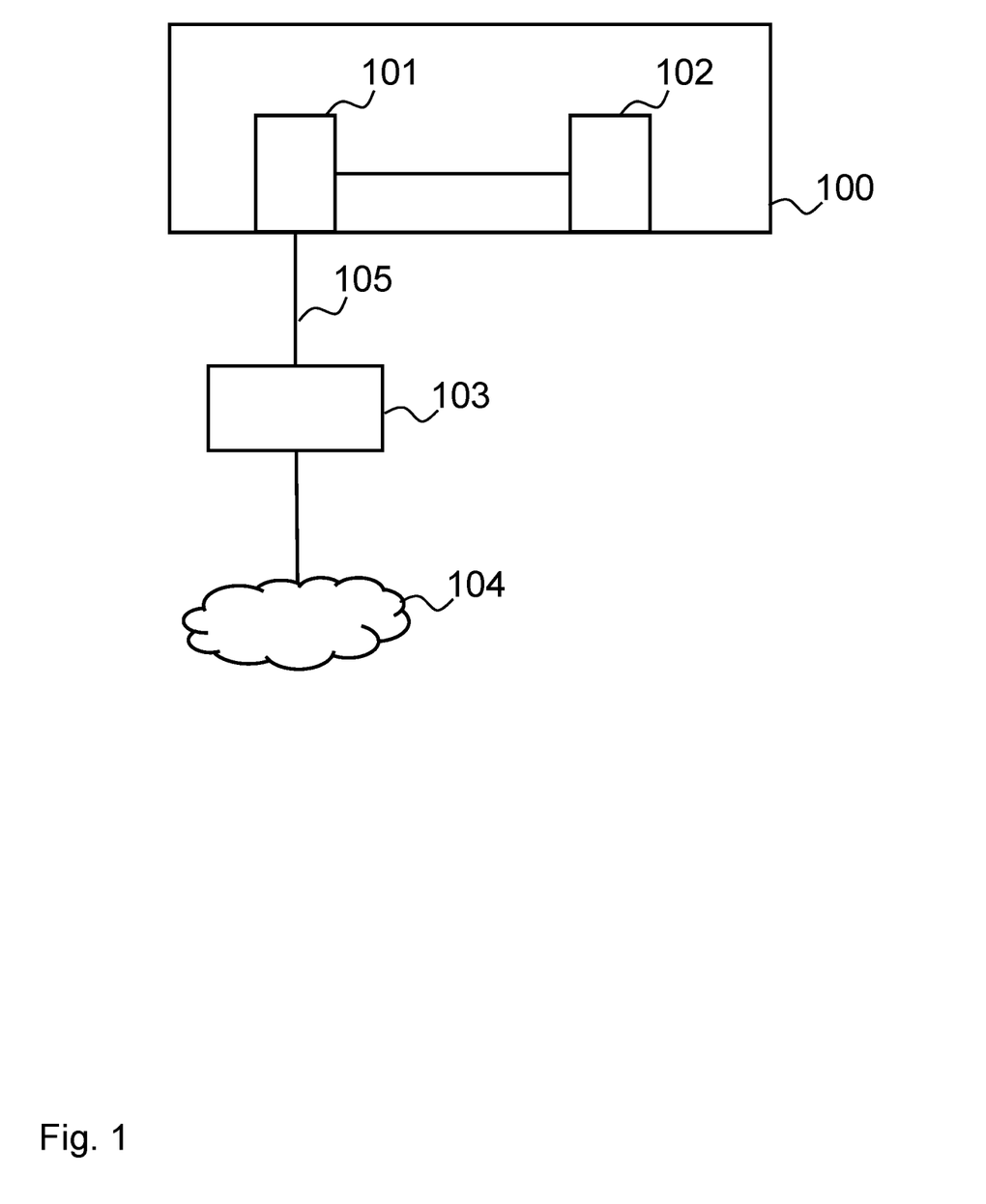
FIG. 1 shows a schematic diagram of an arrangement according to the state of the art.

FIG. 1 shows an arrangement according to the state of the art. A home communication network 100 comprises a home gateway 101 and a user equipment (UE) 102. The home gateway 101 provides a wireless local area network in the home communication network 100. The wireless local area network may be used by the user equipment 102 or other wireless local area network devices in the home communication network.

The home gateway 101 is connected to a network access entity 103 that provides access to a communication network 104. The communication network 104 may be the Internet. The home gateway 101 is connected to the network access entity 103 via a communication link 105. The communication link 105 may be a fixed line communication link or a wireless communication link, e.g. a cellular radio access network.

For connecting the user equipment 102 to the communication network 104, the user equipment 102 has to connect to the home gateway 101 and via the home gateway 101 to the network access entity 103 and to the communication network 104. The link quality the user equipment 102 obtains is therefore dependent on the communication link and the wireless local area network connection. If the wireless local area network spanned by the home gateway 101 causes problems, the communication link quality decreases, and the user equipment 102 has a poor link quality.

SUMMARY

In an exemplary embodiment, the present invention provides a data flow manager for distributing data of a data stream of a user equipment via a first communication link and via a second communication link. The first communication link connects a home gateway to a first network access entity that provides access to a communication network for the home gateway. The second communication link connects the user equipment to a second network access entity that provides access to the communication network for the user equipment. The user equipment is further connected to the home gateway via a third communication link. The first communication link and the third communication link form a composite communication link. The user equipment is configured to simultaneously communicate over the composite communication link and the second communication link. The data flow manager includes: a network interface configured to receive a first status signal indicating a link quality of the first communication link, a second status signal indicating a link quality of the second communication link and a third status signal indicating a link quality of the composite communication link; and a processor configured to, if at least one of the first status signal or the second status signal indicates a higher link quality than a link quality that is indicated by the third status signal, determine a reduction of an amount of data of the data stream communicated over the first communication link and an increase of an amount of data of the data stream communicated over the second communication link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the invention provide an advantageous manner for distributing data.

A link quality may be increased by distributing a data stream of a user equipment via a first communication link and a second communication link based on the quality of the first communication link and a third communication link that form a composite communication link.

According to a first aspect of the invention, a data flow manager distributes data of a data stream of a user equipment via a first communication link and via a second communication link. The first communication link connects a home gateway to a first network access entity that provides access to a communication network for the home gateway. The second communication link connects the user equipment to a second network access entity that provides access to the communication network for the user equipment. The user equipment is further connected to the home gateway via a third communication link. The first communication link and the third communication link form a composite communication link. The user equipment is configured to simultaneously communicate over the composite communication link and the second communication link in the communication network. The data flow manager comprises a network interface configured to receive a first status signal indicating a link quality of the first communication link, a second status signal indicating a link quality of the second communication link and a third status signal indicating a link quality of the composite communication link. The data flow manager comprises a processor configured to determine a reduction of an amount of data of the data stream communicated over the first communication link and to determine an increase of an amount of data of the data stream communicated over the second communication link, if at least one of the first status signal or the second status signal indicates a higher link quality than a link quality that is indicated by the third status signal.

The data flow manager distributes data of a data stream towards or from a user equipment via a first communication link and via a second communication link. The data flow manager distributes data of a downlink data stream and/or of an uplink data stream. The data flow manager may be allocated in a virtual computer system or a physical computer system. The data flow manager may be allocated in a Long-Term Evolution (LTE) or a 5G communications network. The 5G communication network may be a converged communication network, comprising fixed and mobile network elements and functions. For example, the data flow manager may be allocated in an access and mobility management function (AMF), in a session management function (SMF), an application function (AF) or other functional blocks within a 5G network architecture. The data flow manager may alternatively be allocated in a mobility management entity (MME), a serving gateway (SGW) or a packet data network gateway (PGW) of a LTE network architecture. The data flow manager may comprise support for or be part of an access traffic steering, switching and splitting (ATSSS) function. This may show benefits in access networks from 3GPP and non-3GPP networks.

The data flow manager may be virtualized and distributed over a plurality of servers running different network services or functions, including possible functional splits across different servers. The data flow manager may be allocated centrally or peripheral, in particular in an edge cloud of the communication network. Such a virtual system has resource and flexibility benefits compared to a communication network with monolithic functions. For example, a functional split of network functions or entities is possible.

The data flow manager may be split in other functional entities of layer 2, 2.5 or 3 of LTE or 5G communication networks. The data flow manager may also be part of a hybrid-access aggregation point (HAAP), which controls access bundling in digital subscriber line (DSL) and/or LTE or 5G. Such a hybrid access may be used to connect the home gateway to the network access entity.

Different policies for the data flow management may be used. For example, the data flow manager controls the increase and/or the reduction of the amount of data of the data stream based on at least one of the following parameters: providing a constant data rate to the user equipment, providing a constant aggregated data rate to the user equipment, guaranteeing a minimum data rate for transmissions towards and from the user equipment, prioritization of the first network access entity or the second network access entity, prioritization of the network access entity comprising a fixed-line communication link before the network access entity comprising a radio access network (RAN) communication link.

The data flow manager may be configured to use different criteria for optimizing the data stream of the user equipment; for example, the data flow manager controls the data stream, i.e. the increase and/or the reduction of the amount of data of the data stream in a way that communication resources required for the transmission are minimized.

The temporal granularity of the control mechanisms of the data flow manager may vary, in particular may be down to millisecond or sub-millisecond range. The control mechanisms may comprise existing control protocols, for example multipath transmission control protocol (MPTCP) and/or new control protocols.

The network links, i.e. the first communication link and the second communication link may be heterogeneous access network links with a varying link quality, in particular a link quality that is variable in a time and/or space dimension.

The user equipment may be a smartphone, a tablet computer or a notebook. The user equipment may be configured to communicate simultaneously over the second communication link, for example a cellular radio access network (RAN), in particular LTE or 5G, and a third communication link, for example a wireless local area network link. The user equipment may be configured to communicate via the second communication link and the third communication link simultaneously, i.e. to aggregate the data rates transmitted simultaneously via the two links.

The home gateway may function as a router for the home network. The first communication link may be a fixed line communication link, in particular DSL or a fiber connection, or a radio communication link, in particular a cellular RAN. The home gateway may be configured to provide a third communication link, in particular a wireless local area network link.

From the user equipment point of view, there are two possible communication links into the communication network. On the one hand, there is the second communication link that connects the user equipment directly to an access entity of the communication network, in particular a base station (e.g. an eNodeB or a gNodeB). On the other hand, the user equipment may communicate with the communication network via the composite communication link, i.e. via the third communication link, the home gateway and the first communication link.

The data flow manager may act as an access resource manager. The data flow manager comprises a network interface. The network interface of the data flow manager may be a control plane interface. The network interface is a logical interface comprising an interface for receiving and transmitting signals in a direction of a core network and interfaces for receiving and transmitting signals in a direction towards the first network access entity and the second network access entity, respectively. The network interface may be a logical network interface. The data flow manager further comprises a processor. The processor may be a virtual processor or a central processing unit (CPU) or a microcontroller within a computer system. For example, the data flow manager is allocated within a server and the processor comprises the CPU of the server.

Determining an increase and a decrease of an amount of data towards or from the user equipment may comprise providing distribution parameters specifying the amount of data that is to be reduced and the amount of data that is to be increased over the first communication link or the second communication link, respectively. Therefore, the data flow manager provides an advantageous possibility to maintain or to improve the link quality obtained by the user equipment without determining the link quality of the third communication link directly. Resources of the communication network, in particular the RAN, may be optimized by using the data flow manager, in particular the required resources may be reduced compared to a common network architecture without the data flow manager.

In an embodiment, the processor is configured to determine a reduction of a data rate or a reduced data rate on the first communication link for reducing the data amount communicated over the first communication link. The processor is further configured to determine an increase of a data rate or an increased data rate on the second communication link, in particular a corresponding increase of the data rate, for increasing the data amount communicated over the second communication link.

The data rates indicate the amount of data per time of the data streams that are communicated over the first communication link or the second communication link, respectively.

In an embodiment, the processor is configured to determine a first amount of data of the data stream communicated over the first communication link and a second amount of data of the data stream communicated over the second communication link, the first amount of data being smaller than the second amount of data, in order to determine the reduction of amount of data of the first communication link and the increase of amount of data of the second communication link.

A distribution of the amount of data may further increase the quality of the communication links on the UE by distributing a predetermined amount of data onto two different amounts of data that are transmitted via the first and the second communication links.

In an embodiment, the processor is configured to determine the reduction of the data communicated over the first communication link and the increase of the data communicated over the second communication link, if a comparison of the link quality of the first communication link and the quality of a composite communication link indicates the disturbance of the third communication link.

The data flow manager and other entities of the communication network are in general not able to directly determine a quality of a communication link that is established within the home network, in particular established by the home gateway. The first data signal indicating the link quality of the first communication link and the third status signal indicating the link quality of the composite communication link allow the data flow manager to determine indirectly the link quality of the third communication link.

In an embodiment, the processor is configured to assess that the third communication link is disturbed if the first link quality is higher than the third link quality or if the link quality indicated by the third status signal has deteriorated within a predetermined time interval with respect to the first link quality.

The third link quality, i.e. the quality of the third communication link, may deteriorate. If the deterioration is bigger than a predetermined value in a predetermined time, the processor may determine that the link quality of the third link is not good enough for a failure-free transmission or for providing a certain data rate.

In an embodiment, the respective link quality may be determined via a link quality indicator that indicates at least one of the following link quality parameters: possible data throughput, bit error rate, packet error rate, communication delay, signal-to-noise ratio, communication bandwidth.

These parameters influence a transmission and may be detected directly or indirectly.

In an embodiment, the processor is configured to determine the reduction of the amount of data and the increase of the amount of data based on a look-up table, the look-up table assigning reduction of amounts of data and increase of amounts of data to link qualities.

A look-up table may decrease the processing time that is needed to determine the reduction and/or the increase of the amount of data, respectively.

In an embodiment, the processor is configured to output a first data control signal indicating a reduction of the amount of data and to output a second data control signal indicating an increase of the amount of data, wherein the network interface is configured to transmit the first data control signal towards the first network access entity and to transmit the second control signal towards the second network access entity. Alternatively, the network interface is configured to transmit the first data control signal and the second data control signal towards a network node, in particular a network node of a user plane such as a router, which manages data communications towards the first network access entity and the second network access entity. Hence, the 5G principles of control plane/user plane split (CUPS) can be applied.

Providing control signals to control the data stream of the user equipment allows the data flow manager to directly influence the data stream of the user equipment.

In an embodiment, the network interface is communicatively connected to the first network access entity for receiving the first status signal and the third status signal from the first network access entity, and the network interface is communicatively connected to the second network access entity for receiving the second status signal.

According to a second aspect, a communication system comprises a first network access entity for providing a network access via a first communication link to a communication network for a home gateway, a second network access entity for providing a network access via a second communication link to the communication network for a user equipment. The home gateway is configured to connect to the communication network via the first communication link and the user equipment is configured to connect to the home gateway via a third communication link. The first communication link and the third communication link form a composite communication link. The user equipment is configured to simultaneously communicate over the composite communication link and the second communication link in a communication network. The communication system further comprises a data flow manager comprising a network interface configured to receive a first status signal indicating a link quality of the first communication link, a second status signal indicating a link quality of the second communication link and a third status signal indicating a link quality of the composite communication link. The data flow manager comprises a processor configured to determine a reduction of an amount of data of the data stream communicated over the first communication link and to determine an increase of an amount of data of the data stream communicated over the second communication link, if at least one of the first status signal or the second status signal indicates a higher link quality than a link quality that is indicated by the third status signal.

The communication system may provide a constantly high link quality for the user equipment.

According to a third aspect, the invention provides a method for assigning data of a data stream of a user equipment via a first communication link and via a second communication link, the first communication link connecting a home gateway to a first network access entity that provides access to a communication network for the home gateway. The second communication link connects the user equipment to a second network access entity that provides access to the communication network for the user equipment. The user equipment is further connected to the home gateway via a third communication link. The first communication link and the third communication link form a composite communication link. The user equipment is configured to simultaneously communicate over the composite communication link and the second communication link in a communication network. The method comprises: receiving a first status signal, a second status signal and a third status signal, the first status signal indicating a link quality of the first communication link, the second status signal indicating a link quality of the second communication link, and the third status signal indicating a link quality of the composite communication link; and determining a reduction of an amount of data of the data stream communicated over the first communication link and determining an increase of an amount of data of the data stream communicated over the second communication link, if at least one of the first status signal or the second status signal indicates a higher link quality than a link quality that is indicated by the third status signal.

Figure 2:
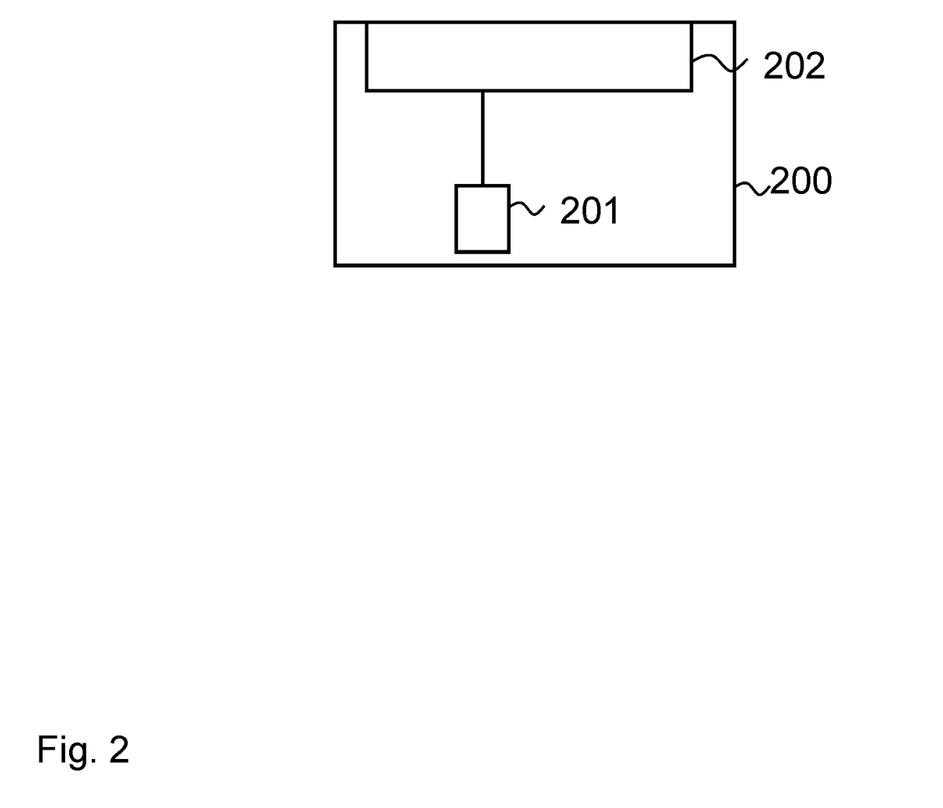
FIG. 2 shows a schematic diagram of a data flow manager according to an embodiment of the invention.

FIG. 2 shows a data flow manager 200. In the described embodiment, the data flow manager 200 acts as an access resource manager. The data flow manager 200 comprises a processor 201. The processor 201 is in the described embodiment the CPU of a server entity within the communication network. In another embodiment, the processor 201 is a virtual processor of a network entity or a plurality of network entities or a microcontroller.

The data flow manager 200 comprises a network interface 202. The network interface 202 of the data flow manager 200 is a control plane interface. The network interface 202 comprises an interface for receiving and transmitting signals in a direction of a core network and interfaces for receiving and transmitting signals in a direction towards the first network access entity and the second network access entity, respectively. The network interface 202 is a logical interface of a network entity the data flow manager 200 is located on. In another embodiment, wherein the data flow manager 200 is a physical entity, the network interface 202 is a physical interface for receiving or transmitting fixed line or radio signals.

The data flow manager 200 is allocated in a core access and mobility management function (AMF) of a 5G network architecture. In another embodiment, the data flow manager 200 is allocated in a session management control function (SMF) of a 5G network or another network entity of a 5G network or of an LTE network, in particular a mobility management entity. In yet another embodiment, the data flow manager 200 is distributed on a functional layer over a plurality of functional network entities, in particular in an edge cloud of the communication network.

Figure 3:
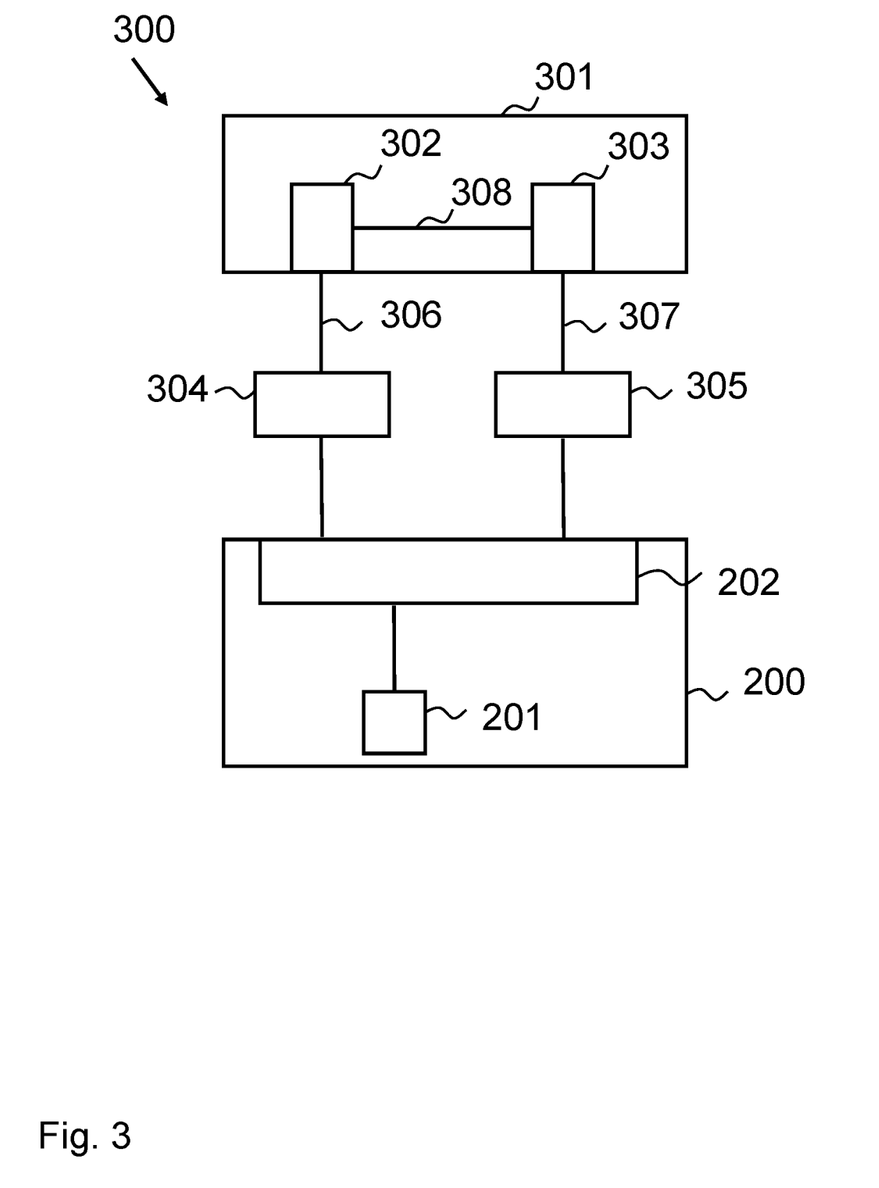
FIG. 3 shows a schematic diagram of an arrangement according to an embodiment of the invention.

FIG. 3 shows an arrangement with the data flow manager 200 according to an embodiment of the invention. The arrangement 300 comprises a home network 301. The home network 301 comprises a home gateway 302. The home gateway 302 is a router for providing a network access to the communication network for private users or business users.

The home network 301 comprises a user equipment 303. The user equipment 303 is a mobile phone, used in the home network 301. In other embodiments, the user equipment 303 is another computer system, in particular a tablet computer, a desktop computer or a smart watch.

The arrangement 300 further shows a first network access entity 304 and a second network access entity 305. In the described embodiment, the first network access entity 304 is an access entity for a fixed line network and provides access to a DSL network.

The second network access entity 305 is a radio access network entity and provides access to a radio access network (RAN). For example, the second network access entity 305 is an eNodeB for an LTE network or gNodeB for a 5G network.

In another embodiment, the first network access entity 304 is also a network access entity for a radio access network. In this embodiment the first network access entity 304 and the second network access entity 305 may be allocated in the same or in different radio cells.

In another embodiment, the first network access entity 304 and/or the second network access entity 305 is a hybrid network access entity for a fixed access network and a radio access network.

The data flow manager 200 is functionally connected to the first network access entity 304 and the second network access entity 305.

The home gateway 302 is connected to the first network access entity 304 via a first communication link 306. In the described embodiment, the first communication link 306 is a fixed line network link.

The second network access entity 305 provides a radio access network. The user equipment 303 is configured to connect to the radio access network that is provided by the second network access entity 305. The connection between the user equipment 303 to the second network access entity is a second communication link 307. Therefore, the second communication link 307 is a radio access network communication link.

The home gateway 302 is configured to provide a third communication link 308, in particular a wireless local area network. In another embodiment, the third communication link 308 may comprise another kind of network link, like fixed-line local area network link, radio access network link or others.

The user equipment 303 has access to the communication network via the second communication link 307 using the second network access entity 305 or via the third communication link 308 and the first communication link 306, therefore, the third communication link 308 and the first communication link 306 forming a composite communication link. The composite communication link includes the home gateway 302.

The data flow manager 300 is configured to receive status signals. In particular, the network interface 202 of the data flow manager 200 is configured to receive status signals and the processor 201 is configured to process status signals. The first network access entity 304 and the second network access entity 305 are configured to forward status signals that are transmitted from the home gateway 302 and/or the user equipment 303 towards the data flow manager 200, i.e. towards the communication network.

The home gateway 302 is configured to transmit a first status signal indicating a link quality of the first communication link 306. The home gateway 302 transmits a status signal and the data flow manager 200 can determine the signal quality and therefore the link quality of the first communication link 306. In particular, the first status signal is a test signal comprising quality information relating the first communication link 306, e.g. bit error rate.

The user equipment 303 is configured to transmit a second status signal via the second communication link 307 towards the data flow manager 200. The second status signal indicates a link quality of the second communication link 307. The user equipment 303 is also configured to transmit a third status signal towards the communication network, in particular towards the data flow manager 200, via the composite communication link. This third status signal can also be a test signal. The third status signal indicates the link quality of the composite communication link. The third status signal indicates the link quality of a combination of the first communication link 306 and the third communication link 308.

The data flow manager 200 is configured to compare the link quality of the first communication link 306, the link quality of the second communication link 307 and the link quality of the composite communication link 308 by comparing the first status signal, the second status signal and the third status signal.

The data flow manager 200 is configured to determine a split of the data stream towards the user equipment 303. For splitting the data stream towards the user equipment 303, the results of the comparisons of the status signals indicating above-mentioned link qualities are used. In a preset, the data stream is transmitted via the first communication link 306 to the home gateway 304 and therefore via the composite communication link towards the user equipment 303.

The result of the comparison of the third status signal and the first status signal indicates the link quality of the third communication link.

The amount of data transmitted over the second communication link 307 is increased, if the comparison of the first status signal and the third status signal indicates that the link quality of the third communication link 308 is lower than the link quality of the first communication link 306.

Furthermore, the amount of data transmitted via the second communication link 307 is also increased, if the second status signal indicates a higher link quality than the link quality indicated by the third status signal.

Figure 4:
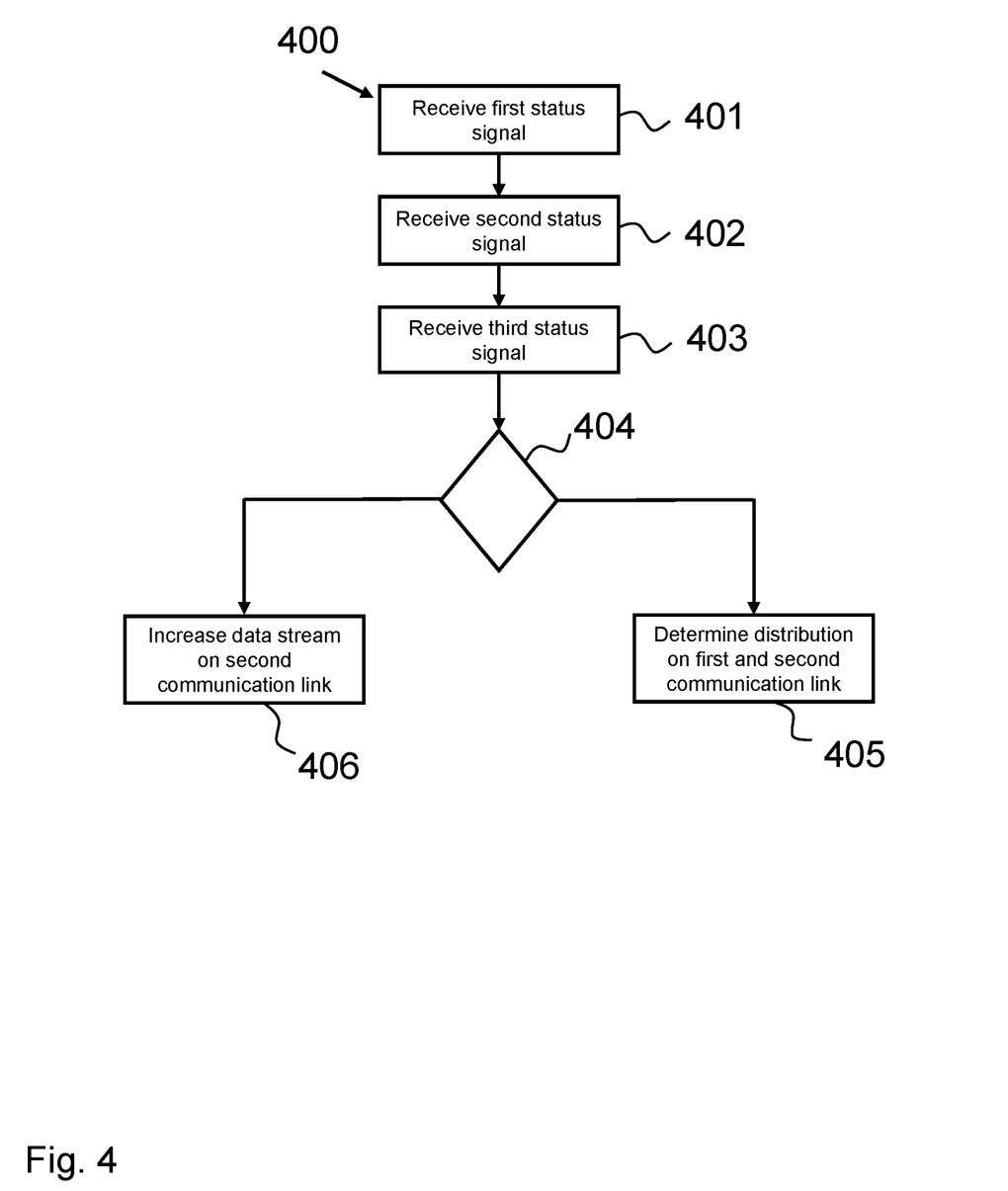
FIG. 4 shows a schematic flowchart diagram of a method according to an embodiment of the invention.

FIG. 4 shows a schematic flowchart diagram of a method according to an embodiment of the invention. In step 401, the data flow manager 200 receives a first status signal. The first status signal is received by the network interface 202.

The received first status signal is transmitted by the home gateway 302 of the home network 301 towards the communication network and is received by the network interface 202 of the data flow manager 200. The first status signal indicates the quality of the first communication link 306.

In step 402, a second status signal is received by the network interface 202 of the data flow manager 200. The second status signal indicates the link quality of the second communication link 307 and was transmitted by the user equipment 303.

In step 403, the network interface 202 of the data flow manager 200 receives a third status signal that indicates the link quality of the composite communication link, i.e. the link quality of the combination of the first communication link 306 and the third communication link 308.

In another embodiment, the first status signal, the second status signal and the third status signal are received in another order.

The received first status signal, the received second status signal and the received third status signal are processed by the processor 201 in step 404. In particular, the processor 201 compares the link quality of the first communication link, the second communication link and the composite communication link by validating the three different status signals. If the comparison in step 404 indicates that the link quality value of the third status signal is at least equal to the link quality value of the first status signal, the data flow manager 200 ignores the third communication link in the distribution of the data stream towards or from the user equipment.

In step 405, the data flow manager 200 determines the distribution of the data stream towards or from the user equipment 303 based on the link quality of the first communication link 306 and the second communication link 307, ignoring the link quality of the third communication link 308 which is at least equal to the quality of the first communication link 306 and therefore doesn't disturb a transmission via the composite communication link. In another embodiment, the step 405 is omitted.

If the comparison of step 404 indicates that the link quality indicated by the first status signal is better than the link quality indicated by the third status signal and/or the quality of the second communication link 307 is better than the link quality of the third communication link 308, the processor 201 determines in step 406 the distribution of the data stream towards or from the user equipment 303 by increasing the amount of data streamed over the second communication link 307 and decreasing the amount of data of the data stream communicated over the first communication link 306.

In another embodiment, the data flow manager 200 does not receive the second status signal of step 402 and/or determines the distribution only based on a comparison of the first status signal with the third status signal. In this case, the data flow manager 200 increases the amount of data of the data stream communicated over the second communication link 307, if the first status signal indicates that the first communication link 306 has a higher link quality than the third communication link 308.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A data flow manager for distributing data of a data stream of a user equipment via a first communication link and via a second communication link, the first communication link connecting a home gateway to a first network access entity that provides access to a communication network for the home gateway, the second communication link connecting the user equipment to a second network access entity that provides access to the communication network for the user equipment, the user equipment being further connected to the home gateway via a third communication link, the first communication link and the third communication link forming a composite communication link, the user equipment being configured to simultaneously communicate over the composite communication link and the second communication link, the data flow manager comprising:
  a network interface configured to receive a first status signal indicating a link quality of the first communication link, a second status signal indicating a link quality of the second communication link and a third status signal indicating a link quality of the composite communication link; and
  a processor configured to, if at least one of the first status signal or the second status signal indicates a higher link quality than a link quality that is indicated by the third status signal, determine a reduction of an amount of data of the data stream communicated over the first communication link and an increase of an amount of data of the data stream communicated over the second communication link.

2. The data flow manager according to claim 1, wherein the processor is configured to determine a reduction of a data rate or a reduced data rate on the first communication link for reducing the data amount communicated over the first communication link, and to determine an increase of a data rate or an increased data rate on the second communication link for increasing the data amount communicated over the second communication link.

3. The data flow manager according to claim 1, wherein the processor is configured to determine a first amount of data of the data stream communicated over the first communication link and a second amount of data of the data stream communicated over the second communication link, the first amount of data being smaller than the second amount of data, in order to determine the reduction of the amount of data on the first communication link and the increase of the amount of data on the second communication link.

4. The data flow manager according to claim 1, wherein the processor is configured to, if a comparison of the link quality of the first communication link and the quality of the composite communication link indicates a disturbance of the third communication link, determine the reduction of the data communicated over the first communication link and the increase of the data communicated over the second communication link.

5. The data flow manager according to claim 4, wherein the processor is configured to assess that the third communication link is disturbed if the first link quality is higher than the third link quality or if the third link quality has deteriorated within a predetermined time interval relative to the first link quality.

6. The data flow manager according to claim 1, wherein the respective link quality indicator indicates at least one of the following link quality parameters: possible data throughput, bit error rate, packet error rate, communication delay, signal to noise ratio, or communication bandwidth.

7. The data flow manager according to claim 1, wherein the processor is configured to determine the reduction of the amount of data and the increase of the amount of data based on a look-up table, the look-up table assigning reductions and increases of amounts of data to link qualities.

8. The data flow manager according to claim 1, wherein the processor is configured to output a first data control signal indicating the reduction of the amount of data of the data stream communicated over the first communication link and to output a second data control signal indicating the increase of the amount of data of the data stream communicated over the second communication link, wherein:
  the network interface is configured to transmit the first data control signal towards the first network access entity and to transmit the second data control signal towards the first network access entity; or
  the network interface is configured to transmit the first data control signal and the second data control signal towards a network node which manages data communications towards the first network access entity and the second network access entity.

9. The data flow manager according to claim 1, wherein the network interface is communicatively connected to the first network access entity for receiving the first status signal and the third status signal from the first network access entity, and wherein the network interface is communicatively connected to the second network access entity for receiving the second status signal.

10. A communication system, comprising:
  a first network access entity for providing a network access via a first communication link to a communication network for a home gateway;
  a second network access entity for providing a network access via a second communication link to the communication network for a user equipment;
  the home gateway, wherein the home gateway is configured to connect to the communication network via the first communication link; and
  the user equipment, wherein the user equipment is configured to connect to the home gateway via a third communication link;
  wherein the first communication link and the third communication link form a composite communication link,
  wherein the user equipment is configured to simultaneously communicate over the composite communication link and the second communication link; and
  wherein the communication system further comprises a data flow manager, the data flow manager comprising:
    a network interface configured to receive a first status signal indicating a link quality of the first communication link, a second status signal indicating a link quality of the second communication link and a third status signal indicating a link quality of the composite communication link; and
    a processor configured to, if at least one of the first status signal or the second status signal indicates a higher link quality than a link quality that is indicated by the third status signal, determine a reduction of an amount of data of the data stream communicated over the first communication link and an increase of an amount of data of the data stream communicated over the second communication link.

11. The communication system according to claim 10, wherein the processor of the data flow manager is configured to determine a reduction of a data rate or a reduced data rate on the first communication link for reducing the data amount communicated over the first communication link, and to determine an increase of a data rate or an increased data rate on the second communication link for increasing the data amount communicated over the second communication link.

12. The communication system according to claim 10, wherein the processor of the data flow manager is configured to determine a first amount of data of the data stream communicated over the first communication link and a second amount of data of the data stream communicated over the second communication link, the first amount of data being smaller than the second amount of data, in order to determine the reduction of the amount of data on the first communication link and the increase of the amount of data on the second communication link.

13. The communication system according to claim 10, wherein the processor of the data flow manager is configured to, if a comparison of the link quality of the first communication link and the quality of the composite communication link indicates a disturbance of the third communication link, determine the reduction of the amount of data communicated over the first communication link and the increase of the amount of data communicated over the second communication link.

14. The communication system according to claim 10, wherein the processor of the data flow manager is configured to assess that the third communication link is disturbed if the first link quality is higher than the third link quality or if the third link quality has deteriorated within a predetermined time interval relative to the first link quality.

15. A method for assigning data of a data stream of a user equipment via a first communication link and via a second communication link, the first communication link connecting a home gateway to a first network access entity that provides access to a communication network for the home gateway, the second communication link connecting the user equipment to a second network access entity that provides access to the communication network for the user equipment, the user equipment being further connected to the home gateway via a third communication link, the first communication link and the third communication link forming a composite communication link, the user equipment being configured to simultaneously communicate over the composite communication link and the second communication link in a communication network, the method comprising:

receiving a first status signal, a second status signal and a third status signal, the first status signal indicating a link quality of the first communication link, the second status signal indicating a link quality of the second communication link, and the third status signal indicating a link quality of the composite communication link; and     if at least one of the first status signal or the second status signal indicates a higher link quality than a link quality that is indicated by the third status signal, determining a reduction of an amount of data of the data stream communicated over the first communication link and an increase of an amount of data of the data stream communicated over the second communication link.

\* \* \* \* \*